United States Patent [19]

Colgan

[11] Patent Number: 5,076,477

[45] Date of Patent: Dec. 31, 1991

[54] SPARE TIRE COVER

[76] Inventor: Bill Colgan, 1945-B Placentia Ave., Costa Mesa, Calif. 92627

[21] Appl. No.: 610,462

[22] Filed: Nov. 7, 1990

Related U.S. Application Data

[63] Continuation of Ser. No. 404,763, Sep. 8, 1989, abandoned.

[51] Int. Cl.$^5$ .............................................. B62D 43/00
[52] U.S. Cl. .................................. 224/42.2; 206/304.1
[58] Field of Search ...................... 224/42.2, 318, 325; 206/304, 304.1, 304.2; 296/37.3

[56] References Cited

U.S. PATENT DOCUMENTS

| | | |
|---|---|---|
| 788,215 | 4/1905 | Mitchell ........................... 206/304.1 |
| 1,153,305 | 9/1915 | Heath . |
| 1,379,297 | 5/1921 | Draver . |
| 1,387,525 | 8/1921 | Warner . |
| 1,398,259 | 11/1921 | Dube ................................ 206/304.1 |
| 1,461,021 | 7/1923 | Bate . |
| 1,508,419 | 9/1924 | Sundback . |
| 1,696,009 | 7/1927 | McCormick . |
| 1,704,555 | 3/1929 | Cluff . |
| 1,917,157 | 7/1933 | Ricci . |
| 2,189,407 | 2/1940 | Rueppel . |
| 4,126,169 | 11/1978 | Magnuson . |
| 4,214,683 | 7/1980 | Willis et al. ......................... 224/42.2 |
| 4,932,573 | 6/1990 | Flint ................................. 224/42.2 |

FOREIGN PATENT DOCUMENTS 1746  1/1913  United Kingdom ............. 206/304.1

Primary Examiner—Linda J. Sholl
Attorney, Agent, or Firm—Fulwider, Patton, Lee & Utecht

[57] ABSTRACT

A flexible spare tire cover for enveloping an externally carried tire/wheel combination mounted to a bracket. The cover consists of two partially joined halves, the inner half incorporating a small substantially rigid and flat mounting plate at its center that is sandwiched between the wheel and mounting bracket. A zip fastener enables the unjoined sections of the cover halves to attach to one another serving to completely enclose the spare tire. The cover is quickly and easily fitted in a preselected angular orientation and is not susceptible to misalignment during use.

4 Claims, 1 Drawing Sheet

SPARE TIRE COVER

This is a continuation of copending application Ser. No. 07/404,763 filed on 9/8/89 now abandoned.

BACKGROUND OF THE INVENTION

1. Field of the Invention

This invention relates to tire covers, and more particularly, pertains to covers for a spare tire that is externally mounted on a vehicle.

2. Description of the Prior Art

A cover for a spare tire that is carried externally on a vehicle is a well known, popular and useful accessory. The tire cover serves to protect the spare tire/wheel combination from the elements, and additionally enhances the aesthetics of the vehicle on which it is fitted. Tire covers which display logos or messages thereon are especially popular with both the end user as well as advertisers.

While the use of hard-shelled spare tire covers was popular in the past, soft and flexible designs are now favored. Such covers offer substantial savings in weight and cost and are relatively quickly and easily affixed about a spare tire. The flexibility and compactability of flexible designs make them especially appealing to the after-market supply industry by reducing packaging, shipping and shelving costs.

The placement of a logo or message on the cover is an effective marketing tool, initially because of its appeal to the consumer and ultimately to an advertiser due to the high visibility of a message when so prominently displayed on the back of a vehicle. Existing flexible tire covers are typically simply wrapped over the spare tire and retained on the tire with an elastic or tie at the inner or back side of the cover. While this arrangement usually suffices to keep the cover over the tire, complications arise when a logo is placed on the cover in that extra effort must be expended to ensure that the cover is properly mounted on the tire such that the logo is upright or in its favored orientation. In addition, wind buffeting and the like can cause the cover to shift during use, resulting in an undesirable misaligned orientation. In order to minimize the shifting of the tire cover once it is installed over the tire, the elastic or tie at the inner or back side of the tire cover may be strengthened so as to increase the grip by the tire cover of the tire over which it is installed. In so doing, the installation of the tire cover over the tire demands the exertion of additional force by the user sufficient to work the strengthened elastic or tie. As a result, heretofore known soft tire covers are either susceptible to misalignment of the logo or message thereon or require an inordinate amount of effort to install.

In view of the above, it would be advantageous to provide a very compact, inexpensive, and easy to install flexible tire cover for the externally mounted spare tire of a vehicle, which provides protection for the tire from the elements, aesthetically enhances the appearance of the vehicle on which it is installed, and also ensures that the upright or favored orientation of a logo or message on the cover is achieved during mounting and is maintained throughout use.

SUMMARY OF THE INVENTION

The present invention is directed to overcoming the problems set forth above.

The present invention provides a flexible spare tire cover which completely envelopes the tire and attaches in a manner which will maintain the upright or favored orientation of the logo or message placed on the outer side of the tire cover. The cover is installed with minimal amount of effort as it is easily properly oriented and no elastic forces need be overcome to complete the installation. The mounted cover is not subject to shifting during use. The flexibility of the cover in conjunction with the extremely compact mounting and aligning provision incorporated therein allows the entire cover to be reduced to an extremely small package which minimizes packaging, shipping and shelving costs for the supplier.

The cover essentially consists of the two partially joined cover halves. A zip fastener affixed to the periphery of the unjoined sections of the halves provides for the complete enclosure of the spare tire by the cover. A mounting plate is centrally attached to the inner cover half and is constructed of substantially rigid material such as an appropriate plastic. The mounting plate is generally disc-shaped and is furnished with a pattern of holes or cutouts to accommodate any lugs or supports extending between the spare wheel and the vehicle's mounting bracket.

The cover is made of durable, but flexible material such as vinyl while weather-resistant materials are employed in the zip fastener's construction.

In use, the mounting plate of the unzipped cover is simply fitted onto the vehicle's external spare tire mounting bracket, the spare tire/wheel combination is lifted onto the bracket to sandwich the cover's mounting plate in place, and one or two lug nuts or bolts are tightened. Finally, the zip fastener is drawn closed to entirely enclose the spare tire thereby completing the installation.

Other features and advantages of the present invention will become apparent from the following detailed drawings, which illustrate, by way of example, the principles of the invention.

DETAILED DESCRIPTION OF THE INVENTION

The cargo or passenger capacity of a vehicle is commonly increased by removing the spare tire from inside the vehicle and placing the spare tire on an external mounting bracket typically located at the rear of the vehicle. On a vehicle that carries its spare tire underneath its frame, ground clearance can be increased by similarly relocating the spare to such a mounting bracket.

In order to protect the tire from the elements such as UV radiation, smog, moisture, dirt and dust, the tire is often fitted with a cover. Such a cover additionally enhances the aesthetics of the vehicle by concealing the otherwise exposed spare tire and wheel. The tire cover must be rugged and tolerant of repeated handling by the user. In addition, the tire cover must be easy to attach and should not interfere with the mounting and dismounting of the spare. The presence of logos or messages on the outer face of the cover makes it imperative that the proper rotational position of the cover be easily discerned during mounting and that it remain upright or in the favored orientation during use.

Figure 1:
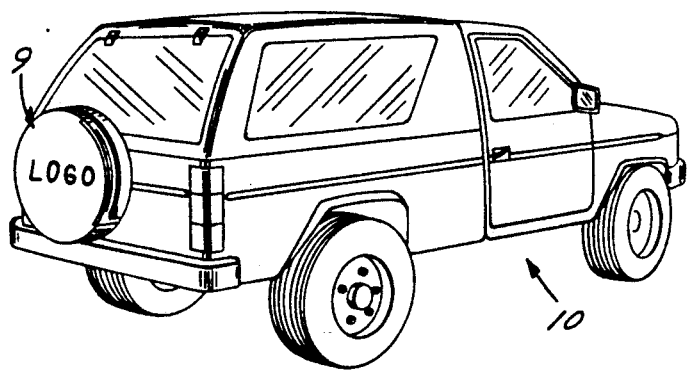
FIG. 1 is a perspective view illustrating a tire cover in place on a vehicle's externally mounted spare tire.
Figure 3:
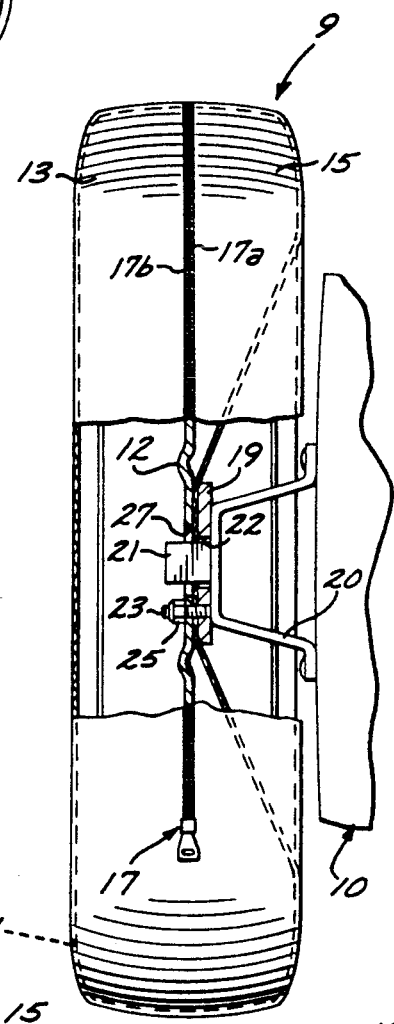
FIG. 3 is a further enlarged cross-section of an embodiment of the present invention.
Figure 2:
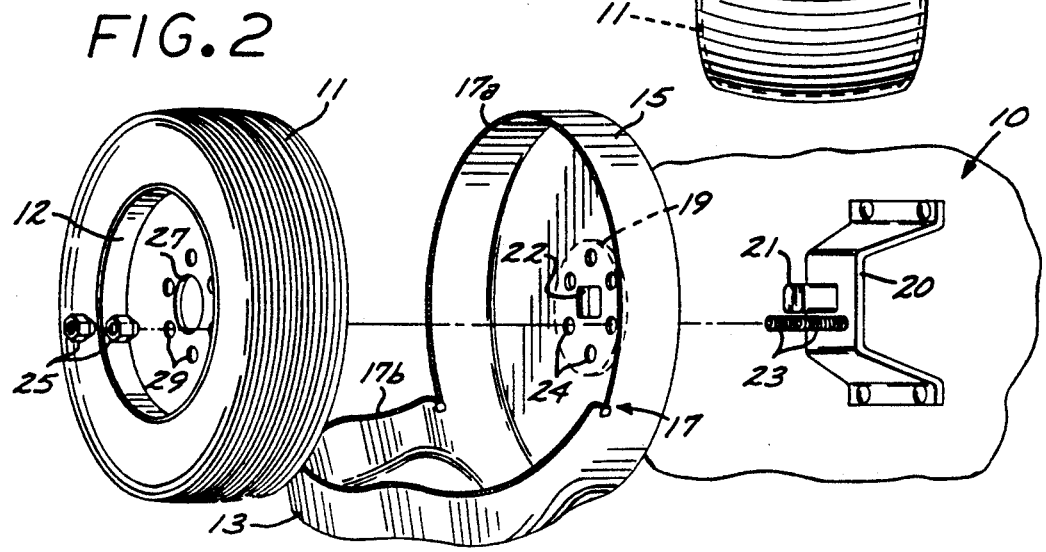
FIG. 2 is an enlarged exploded perspective view illustrating the mounting of a spare tire and the cover of the present invention.

Referring now to the exemplary drawings, FIG. 1 generally illustrates a covered spare tire 9 mounted on the back of a vehicle 10 while FIG. 2 illustrates the manner in which the cover of the present invention is fitted. The cover of the present invention is intended to be used on vehicles having a mounting bracket 20 either affixed directly to the vehicle 10 or alternatively affixed to a hinged member (not shown) with which the entire spare tire/wheel combination when mounted thereto can be swung clear to provide access to a tailgate or trunk. Such brackets typically employ a wheel support post 21, which engages the wheel's central hub opening 27 in addition to a plurality of threaded fasteners by which the wheel is positively held in place. Illustrated is a system whereby threaded studs 23 extend from the bracket 20 through the wheel's lug holes 29 to engage lug nuts 25. Alternatively, the bracket may incorporate threaded holes for receiving lug bolts.

As is clearly shown in the drawings, the cover of the present invention includes an outer cover half 13, partially joined to an inner cover half 15. The unjoined peripheries of the two halves are joinable via a zip fastener 17. A configuration wherein the zip fastener extends about 60% of the spare tire is preferred. The inner cover half 15 has attached to its center a substantially rigid mounting plate 19. The mounting plate has a plurality holes or cutouts (22,24) which are configured to receive the support post 21 and the threaded studs 23 of the bracket 20. The holes in the central mounting plate are chosen and arranged such that the inner cover half 15 can be fitted on the mounting bracket 20 in a preferred angular orientation.

The outer and inner cover halves (13, 15) are shaped to generally conform to the shape of the spare tire/wheel combination (11, 12). Each cover half extends approximately to the center line of the tire 11. One half of a zip fastener 17a, 17b) is affixed to the periphery of each cover half which allows the cover halves to be joined along the circumference of the tire.

The preferred material for the construction of the cover halves (13, 15) is a heavy vinyl, or alternatively, a heavy canvas, such materials being relatively impervious to the elements and capable of resisting substantial abuse. Zip fastener halves 17(a) and 17(b) are attached to the cover halves (13, 15) in any appropriate manner such as by stitching or heat fusion. The mounting plate 19 is preferably constructed of a rigid yet lightweight material such as ABS plastic or aluminum. The mounting plate 19 is affixed directly onto the center of the inner cover half 15 (face to face) after which the cover material covering the mounting plate's (20) cutouts (22, 24) is trimmed away. Alternatively, the mounting plate 19 can, at its periphery, be joined to the inner cover half 15, which has a large cutout therein to accommodate the entire plate. The mounting plate and cover material can be joined in any appropriate manner such as by the use of an adhesive, by heat fusion, stitching, or riveting. The outer cover half 13 when in position over the spare tire/wheel combination (11, 12) provides a large flat expanse, which is customarily adorned with a logo or message. An additional alternative method of manufacture calls for the impregnation of an absorptive cover material (such as canvas) with a substance that solidifies or hardens to form the mounting plate 19 as an integral part of the inner cover half 15. The appropriate holes and cutouts are subsequently formed therein.

In use the tire cover's inner half 15 is first placed over the vehicles mounting bracket 20. The perforation pattern (27, 29) of the mounting plate 19 allows the inner cover half 15 to be fitted to the mounting bracket 20 in the preferred angular orientation. This ensures that when the outer cover half 13 is zipped up, the logo on the front of the outer cover half 13 assumes the proper or the favored angular orientation. In addition, the positive engagement of the mounting plate 19 with the mounting hardware (21, 23) ensures that this angular orientation is maintained throughout use and is not affected by wind buffeting. The mounting plate 19 is relatively small, only slightly larger than the bolt pattern 29 of the wheel 12 to which the tire 11 is attached. This compact design serves to protect the cover from damage when the heavy spare tire/wheel combination is lifted toward and perhaps at first misaligned with the mounting bracket 20 during attempts to mount the spare tire. Once in place, lug nuts 25 are tightened over studs 23 to positively affix the wheel 12 to the bracket 20. This, of course, sandwiches the inner cover half 15 in between the wheel 12 and the bracket 20. The use of locking lug nuts or other locking devices which would prevent the spare tire from being removed similarly prevents theft of the tire cover. Once in place, the front cover half 13 is positioned over the tire and the zip fastener is closed. This completes the installation of the tire cover and comprises only minimal additional effort when mounting and dismounting the spare tire.

An additional benefit provided by the cover of the present invention is inherent in the compactability of the flexible cover material in combination with the relatively small and flat mounting plate. This provides the supplier with reduced packaging, shipping and shelving costs.

While a particular form of the invention has been illustrated and described, it would be apparent that various modifications can be made without departing from the spirit and the scope of the invention. Finally it is not intended that the invention be limited, except as appended by the claims.

What is claimed is:

1. A soft cover for an externally mounted spare tire/wheel combination, wherein the wheel is attached to a mounting bracket with a plurality of members extending therebetween, comprising:

a first soft cover half sized to enclosed that portion of such spare tire/wheel combination facing such bracket and extending substantially to the centerline of such tire;

a substantially flat and rigid mounting plate, disposed in the center of and directly attached to said inner cover half, having perforations therein for receiving such attachment members extending between such wheel and such bracket;

a second soft cover half sized to enclosed that portion of the wheel/tire combination not enclosed by the first cover half; and means for removably attaching a substantial portion of the periphery of said second soft cover half to the periphery of said first soft cover half.

2. The cover of claim 1 wherein said removable attachment means comprises a zip fastener.

3. The cover of claim 1 wherein said mounting plate comprises substantially disk-shaped member of ABS plastic.

4. The cover of claim 1 wherein said first and second cover halves are constructed of flexible vinyl material, the mounting plate is constructed of ABS plastic and the mounting plate is bonded to the first cover half.

* * * * *